H. J. SHELDRUP & O. O. MALAND.
CONNECTING ROD BEARING.
APPLICATION FILED JAN. 29, 1917.

1,226,603.

Patented May 15, 1917.

WITNESSES

INVENTORS
HILDAR J. SHELDRUP,
OLE O. MALAND,
BY
ATTORNEYS

UNITED STATES PATENT OFFICE.

HILDAR J. SHELDRUP AND OLE O. MALAND, OF PELICAN RAPIDS, MINNESOTA.

CONNECTING-ROD BEARING.

1,226,603.

Specification of Letters Patent.   Patented May 15, 1917.

Application filed January 29, 1917. Serial No. 145,195.

*To all whom it may concern:*

Be it known that we, HILDAR J. SHELDRUP and OLE O. MALAND, citizens of the United States, and residents of Pelican Rapids, in the county of Ottertail and State of Minnesota, have invented a certain new and useful Improvement in Connecting-Rod Bearings, of which the following is a specification.

Our present invention relates generally to connecting rods utilized to connect the movable pistons and the crank shafts of internal combustion engines, and more particularly to the bearings thereof upon the crank shafts, our object being to provide an improved bearing whereby to maintain the bearing surfaces of the connecting rod and crank and offset the wear, and to eliminate undue and uneven wear.

The means proposed by our invention for the accomplishment of the above objects, and certain others to be hereinafter made plain, are shown in the accompanying drawing, forming a part of this specification, and in which.

Figure 1:
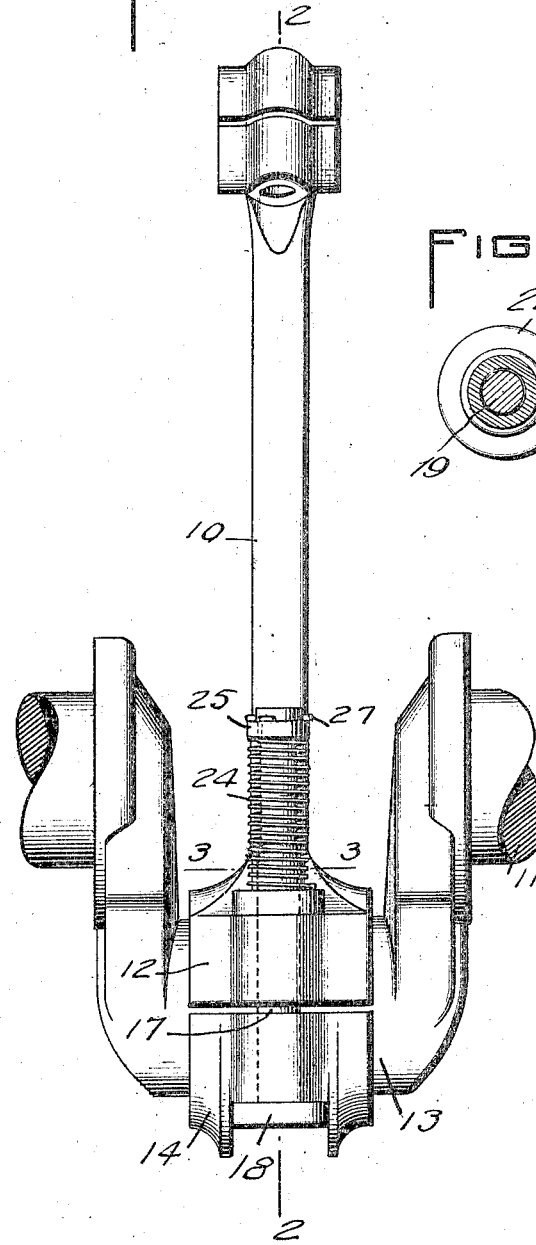
Figure 1 is a front elevation illustrating a connecting rod and crank shaft in operative relation, and provided with our improvements.

Referring now to these figures, we have shown a connecting rod at 10, and a crank shaft at 11, the connecting rod having a cylindrical bearing 12 at its lower end for the reception of the crank 13 of the shaft 11.

In accordance with our invention, the lower half or semi-cylindrical portion 14 of the bearing 12 is in a separate piece, hingedly connected at one side to the corresponding side of the upper portion 12, by means of a hinge pin 15, the opposite side of the portions 12 and 14 of the bearing being provided with opposing flat faces 16, normally spaced apart in order to provide for relative movement of the respective side of the bearing, in taking up the wear of the bearing when in use.

In order that the parts may be automatically adjusted to take up such wear, which will at the same time eliminate undue wear owing to play in the loose bearing, as well as uneven wear from the same cause, we provide the rigid and movable portions 12 and 14 of the bearing with alined openings at substantially a right angle with respect to the axis of the bearing, through which openings is extended a connecting pin 17, with one end headed at 18, and with its opposite end threaded at 19 and provided with a reduced extension 20 threaded at its extremity as seen at 21.

Figure 3:
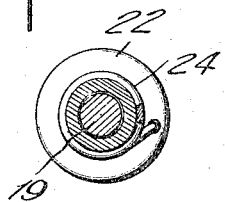
Fig. 3 is a horizontal section through certain of the parts, taken substantially on line 3—3 of Fig. 1.
Figure 2:
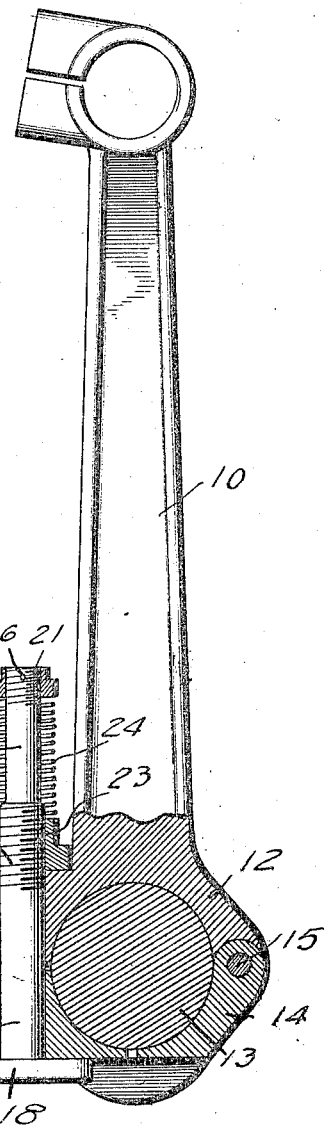
Fig. 2 is a vertical section taken substantially on line 2—2 of Fig. 1.

Upon the threaded portion 19 of the pin 17 is screwed a nut 22, having a reduced collar portion 23 forming a guide for the lower portion of a spring 24 coiled around the reduced extension 20 in spaced relation thereto, with its lower end bent and extending within an opening in the upper outer surface of the nut 22, as clearly seen by a comparison of Figs. 1 and 3. The upper end of spring 24 is similarly bent and extended through the opening of the nut 25, the latter being adapted to screw upon the end thread 21 of the extension 20, and being provided with diametrically opposed openings adapted to aline with an opening 26 of the extension 20, to receive a locking pin 27 shown in Fig. 1.

Thus, after the nut 22 has been screwed upon the threads 19 of the pin 17 firmly against the adjacent surface of the rigid portion 12 of the bearing, the screwing of the nut 25 upon the threads 21 of the extension 20 will twist the spring 24 so as to place the latter under tension, the locking pin 27 serving to hold the nut 25 in proper position, so that the full strength of the spring 24 will be exerted to further rotate the nut 22 for the purpose of moving the lower portion 14 of the bearing toward the upper rigid portion 12 in taking up wear in use.

It is obvious that our invention provides simple, strong, and durable means for the purpose which will be efficient in use, and which will operate to eliminate all undue and uneven wear of the bearing, as a result of the constant automatic take-up of play between the same and the crank 13.

We claim:—

1. A bearing of the character described, consisting of hingedly connected parts having their opposed free ends provided with alined openings transverse with respect to the axis of the bearing, a pin extending through said openings, having a head at one end and threads at its opposite end, and provided at said latter end with an extension also threaded and provided with a transverse opening, a nut for connection with the threads of said pin and for engagement against one of said bearing parts, a coiled spring around the said pin extension having its inner end secured to the said nut, a nut for connection with the threads of said extension, and to which the outer end of said spring is secured, said latter nut having openings to aline with the opening of said extension, and a locking pin for engagement with the alined openings, all substantially as described.

2. A bearing of the character described consisting of hingedly connected parts, having their opposed free ends provided with alined openings, transverse with respect to the axis of the bearing, a pin extending through said openings, having a head at one end and threads at its opposite end and provided at said latter end with an extension also threaded, a nut for connection with the threads of said pin and for engagement against one of said bearing parts, a coiled spring around the said pin extension, having its inner end secured to the said nut, a nut for connection with the threads of said extension and to which the outer end of said spring is secured, and means for locking the last mentioned nut to the pin extension.

3. A bearing of the character described consisting of hingedly connected parts having their opposed free ends provided with alined openings transverse with respect to the axis of the bearing, a pin extending through said openings, having a nut at one end and threads at its opposite end, a nut for connection with the threads of said pin and for engagement against one of said bearing parts, and means for constantly applying rotative pressure to said nut, said means including a spring one end of which is secured to said nut, and a locked nut mounted on a portion of the pin and to which the other end of said spring is secured.

4. A bearing of the character described consisting of hingedly connected parts having their opposed free ends provided with alined openings transverse with respect to the axis of the bearing, a pin extending through said openings having a nut at one end and threads at its opposite end, a nut for connection with the threads of said pin and for engagement against one of said bearing parts, and spring controlled means for constantly applying rotative pressure to said nut, for the purpose described.

HILDAR J. SHELDRUP.
OLE O. MALAND.